United States Patent
Epps et al.

(10) Patent No.: US 9,425,706 B2
(45) Date of Patent: Aug. 23, 2016

(54) CONTROL OF A DC-AC INVERTER WITH UNBALANCED LOADING

(71) Applicant: GE Aviation Systems LLC, Grand Rapids, MI (US)

(72) Inventors: Philip Henry Richard Epps, Margate, FL (US); Andrew Benjamin Cole, Boca Raton, FL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 29 days.

(21) Appl. No.: 14/316,007

(22) Filed: Jun. 26, 2014

(65) Prior Publication Data

US 2015/0092461 A1    Apr. 2, 2015

Related U.S. Application Data

(60) Provisional application No. 61/883,662, filed on Sep. 27, 2013.

(51) Int. Cl.
| | | |
|---|---|---|
| *H02M 7/537* | (2006.01) | |
| *H02M 3/24* | (2006.01) | |
| *H02M 1/00* | (2006.01) | |

(52) U.S. Cl.
CPC .............. *H02M 7/537* (2013.01); *H02M 3/24* (2013.01); *H02M 2001/007* (2013.01)

(58) Field of Classification Search
CPC ...... H02M 3/158; H02M 5/458; H02M 1/14; H02M 7/515; H02J 9/06
USPC ......... 363/16–20, 34–40, 54, 65, 86, 89, 98; 307/46, 64–66, 110; 323/208, 280, 282
See application file for complete search history.

(56) References Cited

U.S. PATENT DOCUMENTS

| | | | | |
|---|---|---|---|---|
| 4,494,180 | A * | 1/1985 | Streater .................. | H02M 3/10 318/801 |
| 5,566,060 | A * | 10/1996 | Shimer ................. | H01J 37/241 307/58 |
| 5,654,591 | A * | 8/1997 | Mabboux ................. | H02J 9/06 307/64 |
| 6,678,174 | B2 * | 1/2004 | Suzui ...................... | H02J 3/383 363/34 |
| 7,405,496 | B2 | 7/2008 | Wagoner et al. | |
| 7,479,774 | B2 * | 1/2009 | Wai ........................ | H02J 3/383 323/222 |
| 7,599,196 | B2 | 10/2009 | Alexander | |
| 8,089,780 | B2 | 1/2012 | Mochikawa et al. | |
| 8,674,544 | B2 * | 3/2014 | Rada ......................... | G05F 1/70 307/38 |
| 8,848,404 | B2 * | 9/2014 | Tan ....................... | H02M 7/515 363/140 |
| 9,099,938 | B2 * | 8/2015 | Ilic .......................... | H02M 7/72 |
| 2009/0296433 | A1 | 12/2009 | Sihler et al. | |
| 2010/0165681 | A1 | 7/2010 | Sakano et al. | |

\* cited by examiner

*Primary Examiner* — Rajnikant Patel
(74) *Attorney, Agent, or Firm* — GE Global Patent Operation; William S. Munnerlyn

(57) ABSTRACT

A three phase inverter consisting of three single phase legs using either switch mode or linear control is fed by a DC-DC converter to provide input output isolation. This requires that the DC-DC converter delivers equal positive and negative voltages to the single phase legs to allow each output to generate a high fidelity sine wave outputs to the load. By measuring the error voltages on the positive output, the negative output and the total output of the DC-DC converter it is possible to control a single duty cycle while maintaining all three output voltages within the limits required by the DC-AC phase legs. This significantly reduces the cost and complexity of the DC-DC converter and eliminates the need to use a fourth phase leg to generate the neutral connection for a three phase output.

7 Claims, 3 Drawing Sheets

CONTROL OF A DC-AC INVERTER WITH UNBALANCED LOADING

CROSS-REFERENCE TO RELATED APPLICATIONS

This application claims the benefit of U.S. Provisional Patent Application No. 61/883,662, filed Sep. 27, 2013, which is incorporated herein by reference in its entirety.

BACKGROUND OF THE INVENTION

The invention pertains generally to the field of electrical power conversion and particularly to controlling DC to AC inverters utilizing semiconductor switches.

The lack of individual regulation of the positive and negative supplies to a DC-AC inverter that does not have a switching node for the neutral causes unbalance issues between the two supplies. A load imbalance between the two supplies can result in distortion and eventually clipping when the inverter is loaded with half-wave rectified loads.

One solution is to use individually regulated supplies with appropriate feedback from the load. But such a solution adds to the cost and complexity of the circuit, in addition to size and weight.

BRIEF DESCRIPTION OF THE INVENTION

One aspect of the invention relates to an inverter phase leg comprising a high supply line and a low supply line across which a DC voltage may be provided. The inverter leg includes a high side gate controlled switch connected to the high supply line and a low side gate controlled switch connected to the low supply line. The switches are connected between the high supply line and the low supply line with an output node between the high side switch and the low side switch. An inverting driver is connected to the high side gate controlled switch and has an input voltage from a control signal, an output voltage for switching the high side gate controlled switch, and a driving voltage. A source of first DC voltage is provided between the output node and the inverting driver. The driving voltage is set to cause the output voltage of the inverting driver to be zero until the input voltage exceeds the first DC voltage, thereby preventing a shoot through condition caused by uncontrolled activation of the high side gate controlled switch.

DESCRIPTION OF EMBODIMENTS OF THE INVENTION

Figure 1:
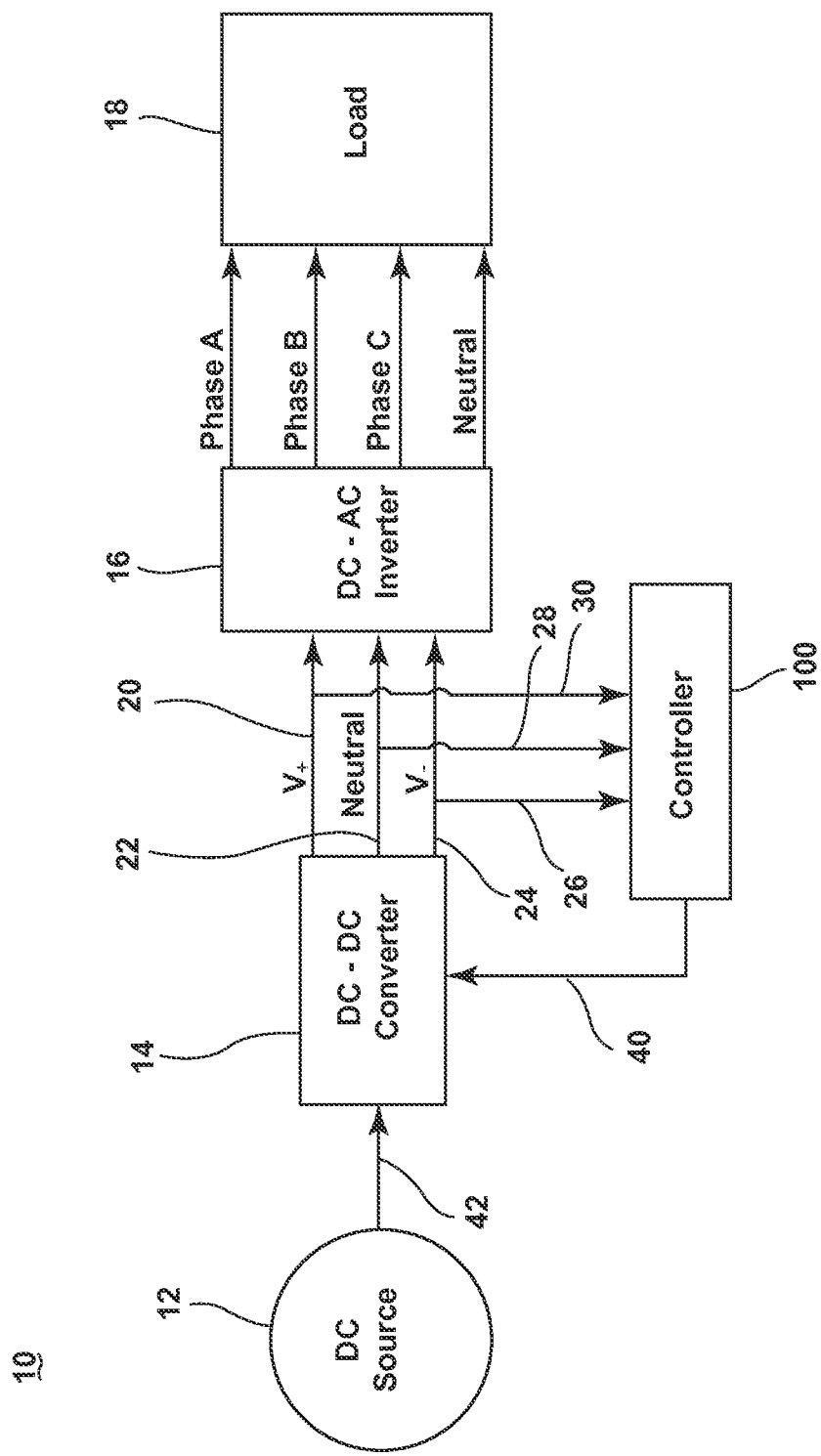
FIG. 1 is a schematic of a control system for a three phase DC-AC inverter according to the invention.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that may implement a module, or method, or include one or more computer program products. However, the drawings should not be construed as imposing any limitations that may be present in the drawings. The method and any computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include or utilize a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, mini-computers, mainframe computers, and the like.

Embodiments may also be practiced in distributed computing environments where tasks are performed by local and remote processing devices that are linked (either by hard-wired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include enabling the production of single and three phase inverters that require fewer power devices and electronics while still retaining the performance improvements that those additional components would effect. This allows for the reduction of the size and weight of an inverter for a given power level which is particularly advantageous for avionic applications.

FIG. 1 is a schematic of a control system 10 for a three phase DC-AC inverter 16 according to the invention. In the control system 10, a source 12 of power at DC voltage is connected to a DC-DC converter 14 to provide galvanic isolation between the input power source 12 and the output power from the DC-DC converter 14. The output power from the DC-DC converter 14 is shown as a split DC supply comprising positive output voltage 20, neutral 22, and negative output voltage 24 to a DC-AC inverter 16. The DC-AC inverter 16 is the type having a plurality of solid state switches such as insulated gate bipolar transistors (IGBTs) or power MOSFETs, or bipolar transistors, or the like. The AC output of the DC-AC inverter 16 is three phase (A, B, C, and neutral), and supplies a load 18.

If the load 18 requires significant half wave power from the DC-AC inverter 16, or is an unbalanced or single phase load there may be significant imbalance between the positive 20 and negative 24 input currents resulting in an unbalance being reflected to the input voltages. One result is distortion of the output waveform and saturation of the DC-AC inverter 16 ("clipping"), which results in inefficient operation of the DC-AC inverter 16 and may result in reduced power supplied to the load 18.

A feedback loop 40 is provided between the input 20, 22, 24 of the DC-AC inverter 16 and an input 42 of the DC-DC converter 14 by way of a controller 100. The controller 100 may be or include a processer, or it may be or include a field programmable gate array. Busses 26, 28, 30 are connected to respective input voltages 20, 22, 24 and to the controller 100 where the respective voltages 20, 22, 24 can be measured. The controller 100 is configured to take the positive voltage 20, neutral 22, and the negative voltage 24 measurements and calculate a total voltage. The controller 100 is also configured to compare the positive 20, negative 24 and total voltages to predetermined levels. Preferably, the predetermined levels are set slightly below 50% of the main regulation voltage. The comparison will result in the generation of three error signals, one for the total voltage and two for the positive and negative output voltages 20, 24.

Once the controller 100 obtains the error signals from the comparison, it is configured to select at least one of the error signals to apply to the input 42 of the DC-DC converter 14 in the feedback loop 40 that will minimize distortion of the AC output.

Figure 2:
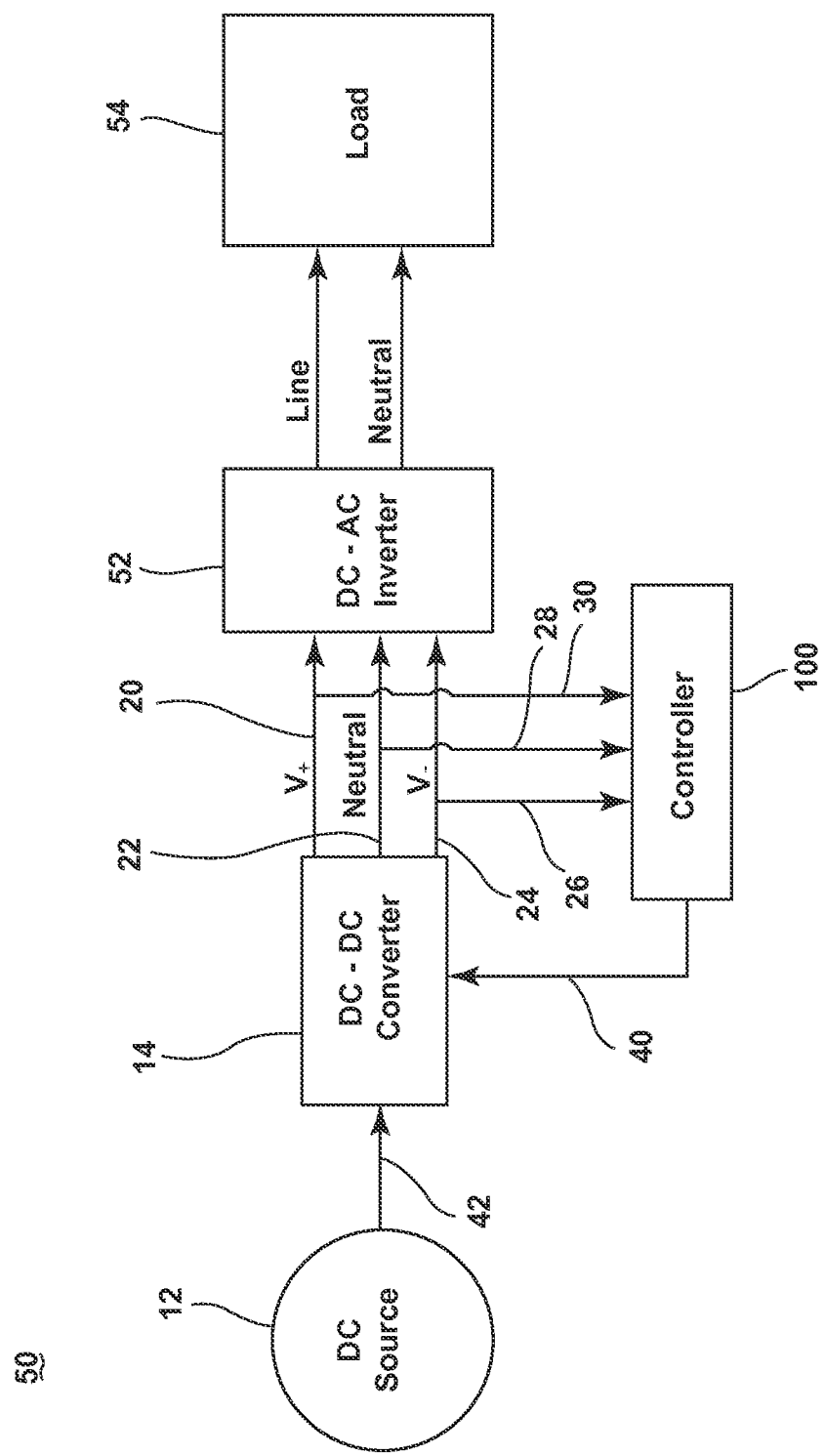
FIG. 2 is a schematic of a control system for a single phase DC-AC inverter according to the invention.

FIG. 2 is a schematic of a control system 50 for a single phase DC-AC inverter 52 according to the invention. In the control system 50, a source 12 of power at DC voltage is connected to a DC-DC converter 14 to provide galvanic isolation between the input power source 12 and the output power from the DC-DC converter 14. The output power from the DC-DC converter 14 is shown as a split DC supply comprising positive output voltage 20, neutral 22, and negative output voltage 24 to a DC-AC inverter 52. The DC-AC inverter 52 is the type having a plurality of solid state switches such as insulated gate bipolar transistors (IGBTs) or power MOSFETs, or bipolar transistors, or the like. The AC output of the DC-AC inverter 52 is single phase (line and neutral 22), and supplies a load 54.

If the load 54 is single phase or requires significant half wave power from the DC-AC inverter 52, there may be significant imbalance between the positive 20 and negative 24 input voltages. One result is distortion of the output waveform and saturation of the DC-AC inverter 52 ("clipping"), which results in inefficient operation of the DC-AC inverter 52 and may result in reduced power supplied to the load 54.

A feedback loop 40 is provided between the input 20, 22, 24 of the DC-AC inverter 52 and an input 42 of the DC-DC converter 14 by way of a controller 100. Busses 26, 28, 30 are connected to respective input voltages 20, 22, 24 and to the controller 100 where the respective voltages 20, 22, 24 can be measured. The controller 100 is configured to take the positive voltage 20, neutral 22, and the negative voltage 24 measurements and calculate a total voltage. The controller 100 is also configured to compare the positive 20, negative 24 and total voltages to predetermined levels. Preferably, the predetermined levels are set slightly below 50% of the main regulation voltage. The comparison will result in the generation of three error signals, one for the total voltage, one for the positive 20 and one for the negative output voltages 24.

Once the controller 100 obtains the error signals from the comparison, it is configured to select the best one of the error signals to apply to the input 42 of the DC-DC converter 14 in the feedback loop 40 that will minimize distortion of the AC output.

Figure 3:
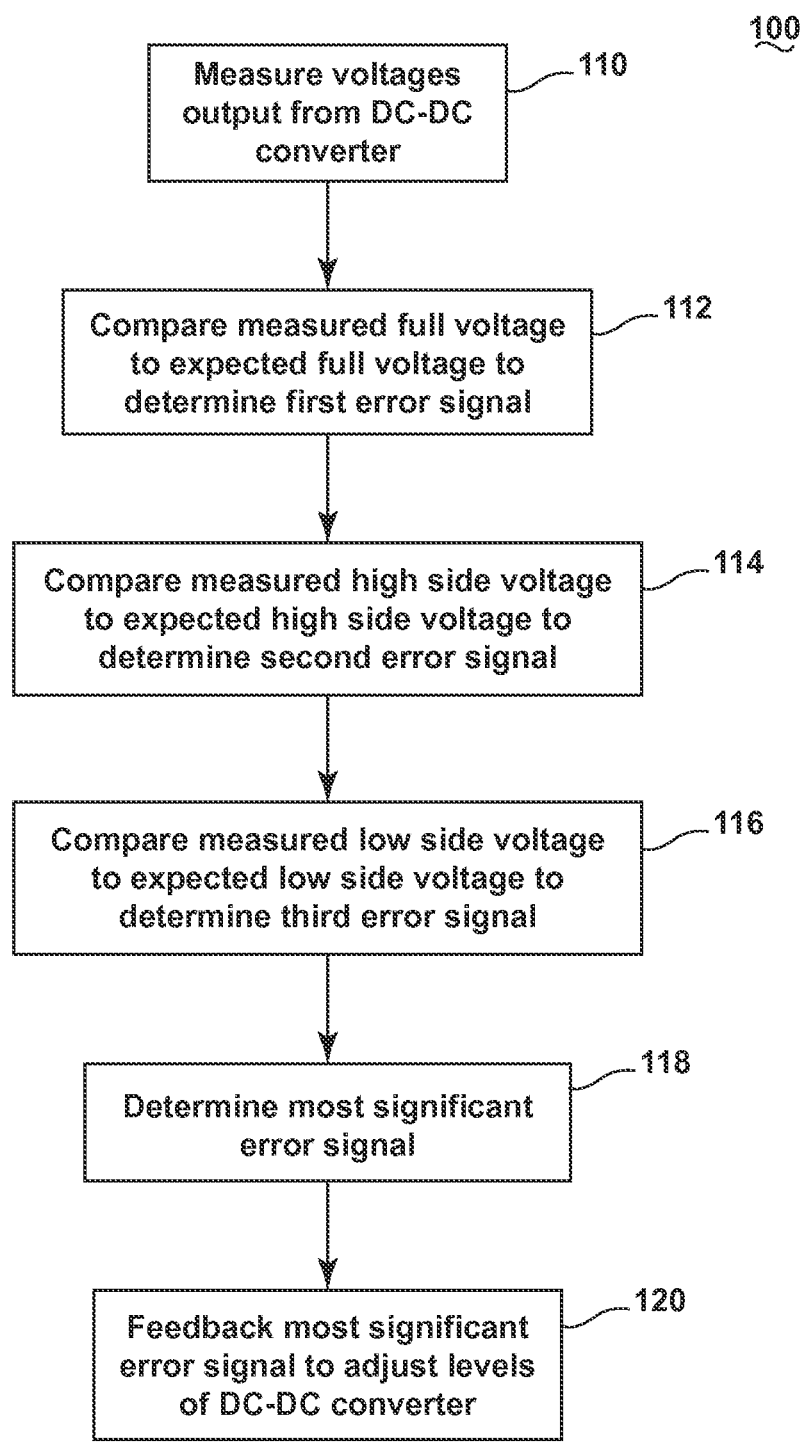
FIG. 3 is a flow chart illustrating a method of controlling voltage inputs to a DC-AC inverter according to the invention.

FIG. 3 is a flow chart illustrating a method of controlling voltage inputs to the DC-AC inverter 16, 52 according to the invention, the method conducted in the feedback loop 40. In the method, the controller 100 measures the positive and negative input voltages 20, 24 to the DC-AC inverter 16, 52 on the busses 26, 30 at 110. Then the controller 100 calculates the total voltage from the measured voltages and compares the total voltage to a predetermined or expected value at 112. If there is a difference a first error signal is determined and/or generated. Similarly at 114, the controller 100 compares the positive or high side voltage 20 to a predetermined or expected value and if there is a difference a second error signal is determined and/or generated. Yet further at 116, the controller 100 compares the negative or low side voltage 24 to a predetermined or expected value and if there is a difference a third error signal is determined and/or generated. At 118, the controller 100 determines the most significant error signal and then at 120, the most significant error is applied to the feedback loop 40 between the controller 100 and the DC-DC converter 14 at the input 42 to adjust the voltage output of the DC-DC converter 14.

Embodiments of the invention relate to the method of selecting the optimal control signal based upon the immediate values of the error signals and their previous values. For context, consider a proportional-integral-derivative controller (PID) which is a control loop feedback mechanism that calculates an error signal as the difference between a desired set point and a measured process variable such as the positive and negative input voltages 20, 24 described above. The controller 100 attempts to minimize the error by adjusting the process control inputs; that is, the input voltage levels. As is well-known in controls applications, the PID controller calculation for minimizing the error involves three separate constant parameters: the proportional, the integral and derivative values. The proportional, the integral and derivative values characterize the present error, the accumulation of past errors and the prediction of future errors. The weighted sum of these attributes is used to adjust the input voltages 20, 24 and better match the input power to the load 18, 54 attached to the system. Other control schemes may use a subset of these control attributes (and form one of a PI, PD, P or I controller).

To achieve the best results, the input error to the controller 100 is selected from the three error signals described above. Under normal operating conditions the error voltage 112 can be both positive to indicate the total voltage is higher than needed, or negative to indicate that the total voltage is lower than needed. This is the preferred error signal that is fed to the PID to control the bus voltage. While this normal mode of operation is in place the error signals 114, 116 will be continually indicating that the voltage they monitor is too high and are ignored. When either error signal 114, 116 indicates the voltage they monitor is too low this signal is immediately selected and routed to the PID controller where it prevents the voltage it is monitoring from falling significantly lower. This error signal remains the controlling signal until one of the other error signals indicates that the error it generates has become negative, at which time control is transferred to that error signal path.

Other methods of determining the most significant error may include characterizing the change in the error over a predetermined duration. In this way, standard norms may be used to quantify the error over time including, for example, calculating the root-mean-square (RMS) of the error signals over a predetermined duration. Alternatively, the largest error over a predetermined duration of time may be used to select the most significant error. Finally, it is contemplated that the history of the error signals may be used to predict by extrapolation the most significant error signal.

An example may help illustrate the method where the most significant error signal is selected by comparing the three input signals (that is the full voltage, the positive voltage 20 and the negative voltage 24 to three respective setpoints. The table below indicates the typical voltages that could occur with an AC load and for DC loading on predominantly the positive or negative sides assuming that only the combined voltage is regulated as in existing systems. The bolded and italicized cells indicate which signal the proposed controller 100 would select for the feedback, and the voltages show how the DC loading causes unbalance.

| 400 volt bus | 400 volt bus | Plus 200 volt bus | Minus 200 volt bus |
|---|---|---|---|
| NO DC Load | *400* | 200 | 200 |
| −ve DC Load | 400 | 220 | *180* |
| +ve DC Load | 400 | *170* | 230 |

The new table below shows the results of the closed loop operation with the signals that were selected from the table above and demonstrates how the supply can now support the half-wave rectified loads without undue additional distortion and clipping;

| 400 volt bus | 400 volt bus | Plus 200 volt bus | Minus 200 volt bus |
|---|---|---|---|
| NO DC Load | *400* | 200 | 200 |
| −ve DC Load | 430 | 235 | 195 |
| +ve DC Load | 440 | 195 | 245 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system for a circuit including a DC supply, a DC-AC inverter of the type having a plurality of solid state switches, a DC-DC converter between the DC supply and the DC-AC inverter, and an AC output from the DC-AC inverter, wherein when a load is applied to the AC output, positive, negative and total voltages are measurable at the input of the DC-AC inverter, characterized by:
   a feedback loop connected between an input of the DC-AC inverter and an input of the DC-DC converter, and
   a controller configured to compare the positive, negative and total voltages to predetermined levels, obtain error voltages from the comparison, and select one of the error voltages to apply to the input of the DC-DC converter in the feedback loop that will minimize distortion of the AC output.

2. The control system of claim 1 wherein the AC output of the DC-AC inverter is three phase.

3. The control system of claim 1 wherein the AC output of the DC-AC inverter is single phase.

4. The control system of claim 1 wherein the output of the DC-DC converter is a split DC supply.

5. The control system of claim 4 wherein the split DC supply includes a positive input voltage, a neutral, and a negative input voltage.

6. The control system of claim 1 wherein the predetermined levels are set slightly below 50% of the main regulation voltage.

7. A method of controlling voltage inputs to a DC-AC inverter of the type having a plurality of solid state switches, a DC supply, a DC-DC converter between the DC supply and the DC-AC inverter, and an AC output wherein when a load is applied to the AC output, positive, negative and total voltage inputs to the DC-AC inverter are measurable via first, second and third busses, characterized by:
comparing the positive, negative and total voltages to predetermined levels on each of the first, second and third busses,
obtaining error voltages for each of the positive, negative and total voltages from the comparison for each of the first, second and third busses,
evaluating the error voltages to determine the most significant for each of the first, second and third busses,
selecting the most significant of the error voltages for each of the first, second and third busses, and
applying the most significant of the error voltages to a feedback loop connected between an output of the DC-DC converter and an input of the DC-DC converter.

* * * * *